(12) United States Patent
Misikangas

(10) Patent No.: US 8,265,656 B2
(45) Date of Patent: Sep. 11, 2012

(54) POSITIONING TECHNIQUE

(75) Inventor: Pauli Misikangas, Helsinki (FI)

(73) Assignee: Ekahau Oy, Helsinki (FI)

(*) Notice: Subject to any disclaimer, the term of this patent is extended or adjusted under 35 U.S.C. 154(b) by 1154 days.

(21) Appl. No.: 11/633,405

(22) Filed: Dec. 5, 2006

(65) Prior Publication Data

US 2007/0149215 A1   Jun. 28, 2007

Related U.S. Application Data

(60) Provisional application No. 60/751,649, filed on Dec. 20, 2005.

(30) Foreign Application Priority Data

Dec. 7, 2005  (FI) .................................... 20055650

(51) Int. Cl.
  *H04W 24/00* (2009.01)
(52) U.S. Cl. ............... 455/456.2; 455/456.1; 455/404.2
(58) Field of Classification Search ................ 455/414.1
  See application file for complete search history.

(56) References Cited

U.S. PATENT DOCUMENTS

| | | | |
|---|---|---|---|
| 5,542,100 A * | 7/1996 | Hatakeyama | ............. 455/404.2 |
| 6,064,339 A | 5/2000 | Wax et al. | |
| 6,393,294 B1 | 5/2002 | Perez-Breva et al. | |
| 6,647,269 B2 * | 11/2003 | Hendrey et al. | ............. 455/456.3 |
| 2003/0008668 A1 | 1/2003 | Perez-Breva et al. | |
| 2005/0249196 A1 * | 11/2005 | Ansari et al. | .................. 370/352 |
| 2005/0266855 A1 | 12/2005 | Zeng et al. | |

FOREIGN PATENT DOCUMENTS

| | | |
|---|---|---|
| DE | 103 45 255 A1 | 4/2005 |
| JP | 2001-313972 | 11/2001 |
| JP | 2005-024540 | 1/2005 |
| WO | WO 2004/008795 A1 | 1/2004 |
| WO | WO 2004/008796 A1 | 1/2004 |
| WO | WO2004008795 A | 1/2004 |
| WO | WO2004008796 A | 1/2004 |
| WO | WO 2004/102936 A1 | 11/2004 |

* cited by examiner

*Primary Examiner* — Kwasi Karikari

(74) *Attorney, Agent, or Firm* — Barnes & Thornburg LLP

(57) ABSTRACT

A technique for positioning a target object in a wireless communication environment. A data model models several sample points. Each sample point includes a location and a set of expected signal values therein. A set of relevance indicators indicates one or more sets of relevant sample points, which are subsets of the sample points in the data model. Signal values are observed at the target object's location. Based on the signal value observations and the set of relevance indicators, a current set of relevant sample points is determined and used, along with the signal value observations, to estimate the target object's location. Computational burden is reduced because sample points not included in the current set of relevant sample points can be omitted from calculations.

9 Claims, 4 Drawing Sheets

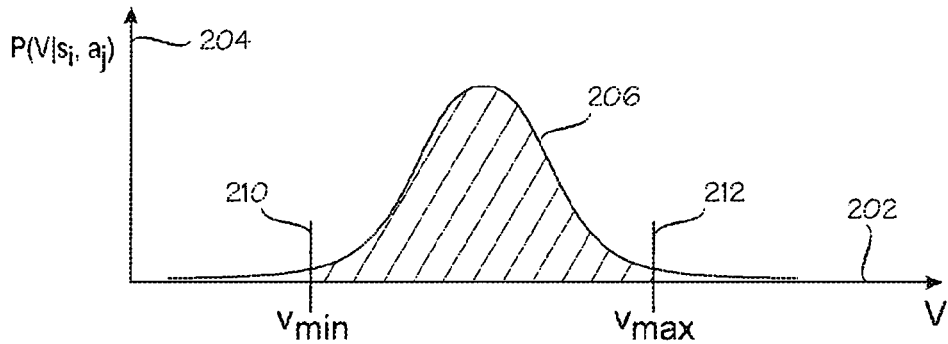
Fig. 2A
$P(V<v_{min} \mid s_i, a_j) = \varepsilon/2$   $P(V>v_{max} \mid s_i, a_j) = \varepsilon/2$
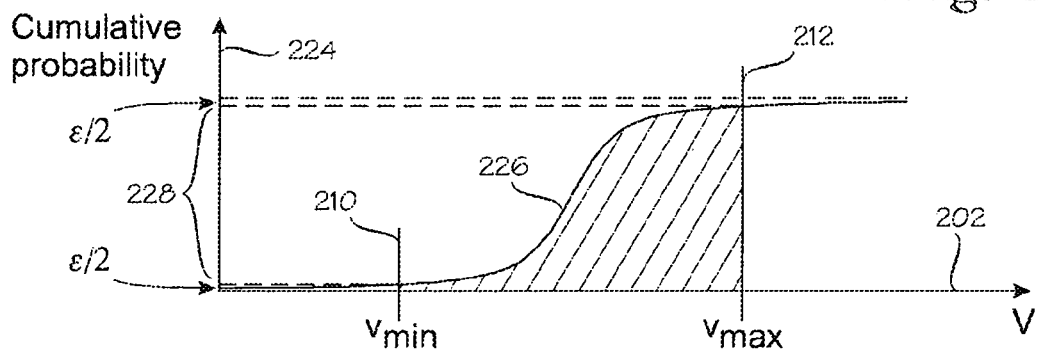
Fig. 2B
Fig. 3
302 → For each $a_j \in A$ do
　　　Begin
304 →　　For each $v \in V$ set $R_j[v] = \{\}$
306 →　　For each $s_i \in S$
　　　　Begin
308 →　　　Calculate $v_{min}$ such that $P(V<v_{min} \mid s_i, a_j) = \varepsilon/2$
310 →　　　Calculate $v_{max}$ such that $P(V>v_{max} \mid s_i, a_j) = \varepsilon/2$
312 →　　　For each $v$ in $[v_{min}, v_{max}]$ do
314 →　　　　$R_j[v] = R_j[v] \cup \{s_i\}$
　　　　End
　　　End

Fig. 4

```
400    Function Find_relevant (in v̄)
       Begin
402 →    Set C = {}  // set of candidates
404 →    F_max = 0  // Number of audible access points
406 →    For each v_i ∈ v̄, v_i ≠ NA Do
         Begin
408 →      F_max = F_max + 1
410 →      For each s_j ∈ R_i[v_i] Do
           Begin
412 →        If s_j ∉ C Then
             Begin
414 →          C = C ∪ {s_j}  // add to set of candidates
416 →          F[j] = 1  // initialize hit counter
             End
             Else
418 →          F[j] = F[j] + 1  // increase hit counter
           End
         End
420 →    Set R = {}
422 →    For each s_j ∈ C Do
         Begin
424 →      If (F_max - F[j]) ≤ K Then
426 →        R = R ∪ {s_j}  // Add to set of relevant sample points
         End
428 →    Return R
       End
```

Fig. 5

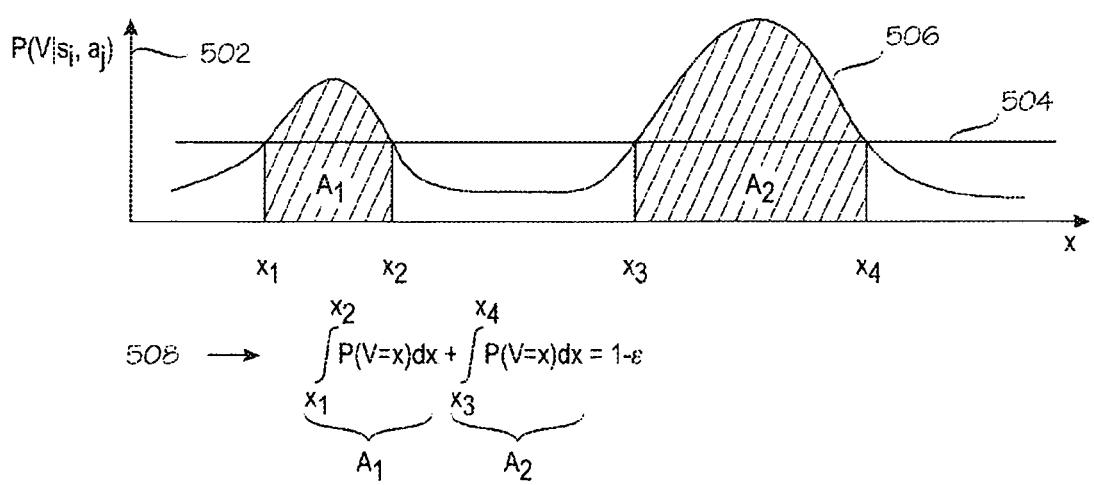

- ● N1 - N20: Graph nodes
- + T1 - T4: Target object locations at 4 different times
- ( ) S11 - S13: Sets of relevant sample points ⊢- - -⊣ Neighbours of relevant sample points
⊢———⊣ Neigbours after excluding impossible transitions

POSITIONING TECHNIQUE

This non-provisional application relies for priority upon U.S. Provisional Application No. 60/751,649, filed on Dec. 20, 2005, which, in turn, relies for priority upon Finnish Patent Application No. 20055650, filed on Dec. 7, 2005, the contents of both of which are incorporated herein by reference in their entireties.

BACKGROUND OF THE INVENTION

The invention relates generally to a positioning technique in which a target object's location is estimated on the basis of observations of one or more physical quantities, such as RF signal parameter values in an environment, such as a radio communication network. The target object is an electronic device capable of making observations of the one or more physical quantities. It may be a general purpose computer or other communication device, or it may be a dedicated positioning device, colloquially referred to as a "tag". Examples of such positioning techniques are disclosed in U.S. Pat. No. 6,393,294 and PCT publication WO2004/102936.

A feature common to the prior art techniques is a database which is based on expected signal parameter values at several locations, called sample points in the above-referenced PCT publication as well as in this document. The database contains, for each of several sample points, expected RF signal parameter values for each of the radio transmitters (also called base stations or access points) detectable in the sample point. The expected signal parameter values can be obtained by actual measurements, propagation simulations, interpolations or any combination of such techniques. As non-restricting examples, the signal parameter can be RF signal strength, phase, bit error rate/ratio, or the like. The general operating principle of the prior art positioning techniques is such that the target object makes RF signal parameter observations in the wireless communication environment, and the target object's position is estimated based on the RF signal parameter observations and the database of expected RF signal parameter values.

A problem with the prior art techniques is the high computational load required to position the target object.

BRIEF DESCRIPTION OF THE INVENTION

An object of the present invention is to provide a method and an apparatus for implementing the method so as to alleviate the above disadvantages. The object of the invention is achieved by the methods and equipment which are characterized by what is stated in the independent claims. The preferred embodiments of the invention are disclosed in the dependent claims.

An aspect of the invention is a method for positioning a target object in a wireless communication environment. The method comprises the following steps or acts:
a) maintaining a data model for a plurality of sample points, each sample point comprising a sample location and a set of expected values for one or more physical quantities at that sample point;
b) maintaining a set of relevance indicators for indicating one or more sets of relevant sample points, wherein the one or more sets of relevant sample points are subsets of the sample points in the data model;
c) making observations of at least one of the physical quantities at the target object's location;
d) based on the observations at the target object's location and the set of relevance indicators, determining a current set of relevant sample points;
e) estimating the target object's location based on the observations at the target object's location and on the current set of relevant sample points;

A benefit of this technique is that sample points not included in the current set of relevant sample points can be omitted from calculations, which reduces the computational load and the battery drain. Alternatively, the resources saved by the inventive technique can be used to obtain a more accurate and/or more secure position estimate by further computations.

Steps a) and c) can be performed as described in the above-reference prior art documents. The expected values of the physical quantities at that sample point may be scalar values, probability distributions (eg normally distributed), histogram structures, or the like. Step b) comprises determining a set of relevance indicators for indicating a set of relevant sample points, which set is a subset of the sample points in the data model. This step will be further described in more detail later. In step d) the observations at the target object's location and the set of relevance indicators are used to determine a current set of relevant sample points. In step e) the target object's location is estimated based on the observations at the target object's location and on the current set of relevant sample points. The location associated with a sample point may be a point, a circle, an area, a segment of a path, a named location (for example, "room 123"), or the like.

Other aspects of the invention relate to a compact or distributed positioning equipment or a computer program product for carrying out the above method.

In one embodiment, the step of determining the current set of relevant sample points comprises selecting sample points whose set of expected values of the physical quantities span the observations at the target object's location with a predetermined relevance criterion.

In another embodiment the predetermined relevance criterion is relaxed if the resulting set of relevant sample points is smaller than a predetermined minimum size. Such a condition may indicate an anomaly, whereby an alarm should be triggered, particularly if the anomaly is persistent. In some embodiments the relevance criterion is adjusted depending on system load. The higher the system load, the stricter the relevance criterion, and vice versa.

Yet another embodiment comprises forming a topology graph that models the topology of the environment, wherein the topology graph indicates a set of nodes and a set of arcs, such that each node indicates a permissible location and each arc indicates a permissible target object transition between two nodes. The topology graph is used to estimate the target object's location. For example, the topology graph may be used to record the target object's motion history and to exclude some of the selected sample points based on the target object's motion history.

In an illustrative but non-restricting implementation of the invention, the target object is simply the device that observes signal quality values in a radio network. In other applications, it may be beneficial to treat the target object as a separate concept from the one or more sensing devices which make the actual observations. For example the sensing devices may be the electronic circuitry making signal strength measurements in a wireless receiver, while the target object is the person or piece or equipment co-located with the sensing devices. Moreover, the invention is not limited to signal strength measurements. Instead, the inventive positioning technique can be used in connection with a wide variety of location-dependent physical quantities, such as:

- radiometric signal quality values, such as signal strength, signal-to-noise ratio, bit error rate/ratio, timing advance, or the like; such signal quality values, if used, are preferably determined separately for each of several frequency bands, channels, cells, base stations or the like;
- atmospheric physical quantities, such as air pressure, temperature, humidity, or the like;
- acoustic quantities, such as noise level, preferably determined separately for each of several frequency bands;
- optical quantities, such as light intensity, colour, spectrum, or the like;
- recognized shapes in still or live images or recognized sounds.

The observations of the target object (or sensing device(s) attached to the target object) are not necessarily raw measurement data but any values derived from the measurement data. For instance, the observations may be derived from the measurement data by mathematic processing, such as smoothing. In addition, some embodiments of the invention make use of device models to correct the observations of the sensing devices. This feature is particularly useful in applications wherein the sensing devices are not specifically designed for accurate measurements.

BRIEF DESCRIPTION OF THE DRAWINGS

In the following the invention will be described in greater detail by means of specific embodiments with reference to the attached drawings, in which:

FIGS. 2A and 2B illustrate a case in which the signal parameter values are treated as continuous values;

FIG. 3 shows an initialization algorithm for initializing sets of relevant sample points;

FIG. 4 shows an algorithm for finding a set of relevant sample points;

FIG. 5 illustrates expansion of the single-peak examples shown in Figures 2A-4 to multiple peaks.

DETAILED DESCRIPTION OF SPECIFIC EMBODIMENTS

Figure 1A:
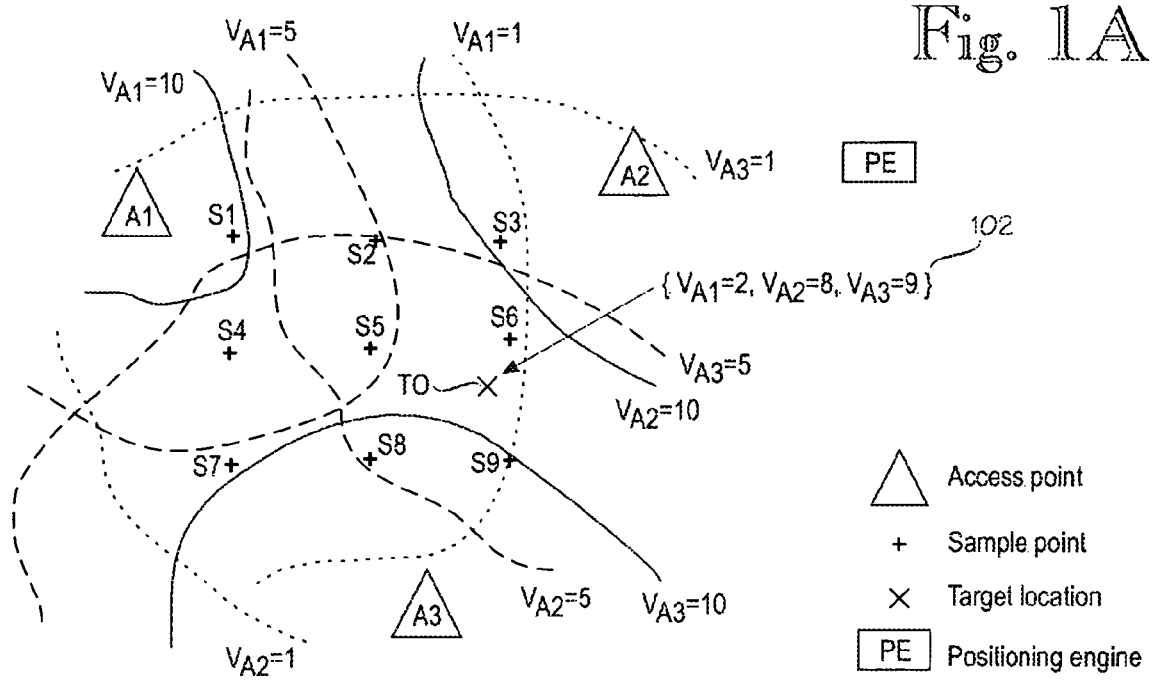
FIG. 1A shows a target object and a section of a radio network with three access points, and a number of sample points.

FIG. 1A shows a target object and a section of a radio network with three access points, and a number of sample points. Triangles marked A1 to A3 denote the three access point. Plus signs marked S1 to S9 denote nine sample points of a data model which models signal parameter values, such as signal strength, in the radio network. Reference sign TO denotes the location of the target object. Depending on context, the reference sign TO may refer to the target object itself or its location. The location of the target object is unknown when positioning begins and only an estimate when it is completed. Reference numeral 102 denotes a set (vector) of RF signal parameter observations made by the target object TO. In this example the observed values of the signal parameter, such as signal strength, at access points A1, A2 and A3 are 2, 8 and 9, respectively. The target object TO is positioned by a positioning engine PE, which may be located in the target object itself in some embodiments. But the resource-saving features of the invention are best utilized when a large number of target objects are positioned by a common positioning engine. In a typical implementation, the positioning engine is a data processing equipment, such as a server or a set of servers, which comprises a data model of the positioning environment, means for receiving signal parameter observation at the target object's location and means for carrying out the method according to the invention.

Figure 1B:
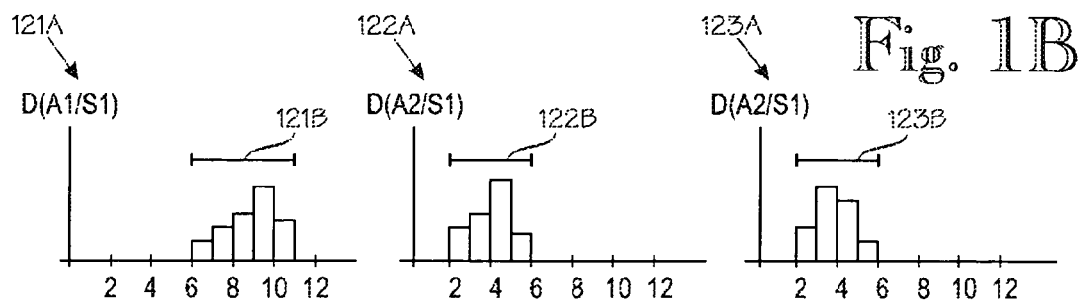
FIG. 1B shows ranges of possible signal quality values for one sample point and three access points.
Figure 1C:
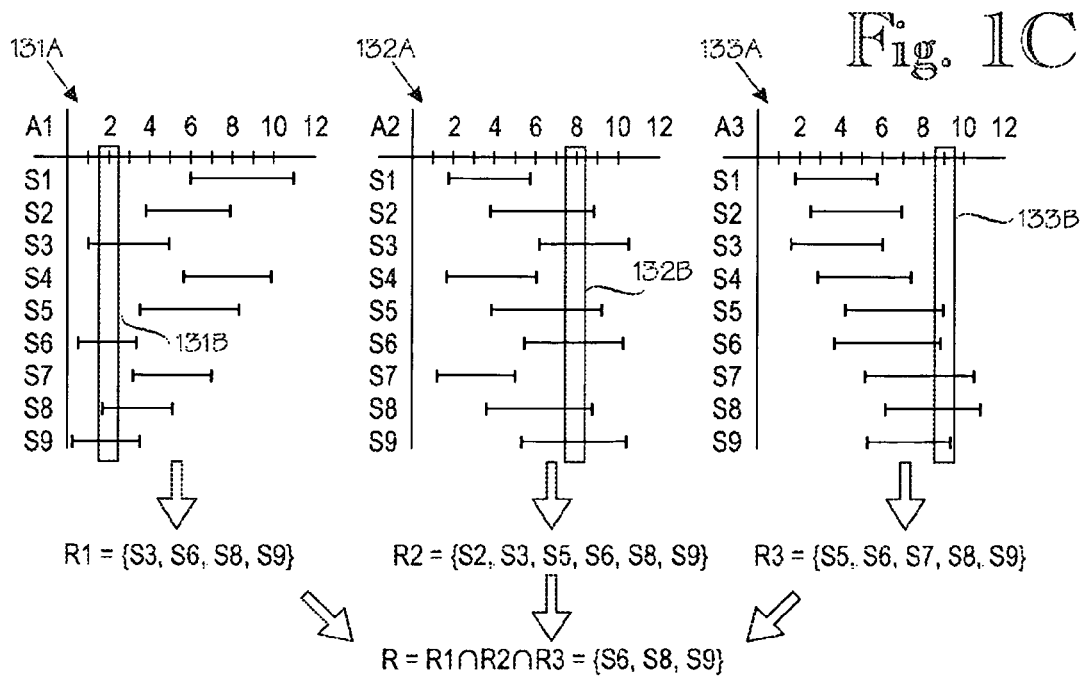
FIG. 1C shows a process of obtaining a set of relevant sample points.

For purposes of illustration, FIG. 1A also shows, for each of the three access points, three lines of equal signal parameter values. These equal-value lines show locations at which the signal value of the access points are 10 (innermost line), 5 (middle line) and 1 (outermost line). These lines are shown only for a better understanding of the invention; they are not used for any computations. FIGS. 1A to 1C depict the signal parameters as simple scalar values between 0 and 12, in order to make the illustration easily understandable to human readers. In a real-life scenario, the signal parameter values could be signal strengths expressed in dBm units, for example.

FIGS. 1B and 1C collectively show an exemplary set of relevance indicators for indicating sets of relevant sample points.

FIG. 1B shows ranges of possible signal quality values for one sample point, namely S1, and the three access points A1 to A3 shown in FIG. 1A. In the embodiment described here, the signal parameter values are treated as discrete values. Of course, any digital measurement system produces "discrete" values, but as used herein, "discrete" implies that the range of possible values is processed as a relatively small number of bins instead of a virtual continuum of digital numbers. It should be understood that a precise definition of "discrete" is not essential, since the invention is applicable to techniques in which the possible signal quality values are considered continuous (non-discrete).

FIG. 1B relates to an embodiment in which the data model is a probabilistic model. A probabilistic model indicates probability distributions for measurable physical quantities, which in this example are signal parameter values. Reference numeral 121A illustrates probability distribution of signal parameter value from access point A1 at sample point S1. In a typical but non-restricting implementation, it means the probability distribution of the signal strength of the signal from A1 at sample point (location) S1. This quantity is denoted by D(A1/S1). The signal strength distribution can be determined by actual measurements, computer simulations or any combination of such techniques.

Horizontal bar 121B denotes a range of possible signal parameter values for the combination of A1 and S1. A signal parameter value is considered possible if it has a probability which deviates from zero by a statistically significant margin. The question of statistical significance involves a compromise between calculation optimization and accuracy/reliability. If the required margin is high (signal values are accepted only if they have a "very" high probability), then only a small number of sample points will be considered relevant and the savings in computational resources are large. On the other hand, there is a risk of ignoring a sample point that might affect positioning.

Reference numerals 122A and 123A denote the corresponding distributions for the remaining access points A2 and A3, respectively. Reference numerals 122B and 123B denote the corresponding values of possible signal parameter values.

To keep FIG. 1B compact, it only shows the ranges of possible signal parameter values for one sample point (S1)

and three access points (A1 to A3). In a real-life system, the ranges of possible signal parameter values should be determined separately for each sample point in the data model (database).

FIG. 1C shows a process of obtaining a set of relevant sample points. Reference numeral 131A denotes a set of ranges of possible signal parameter values for access point A1 and each of the nine sample points S1 to S9 shown in FIG. 1A. Reference numerals 132A and 133A denote similar range sets for the other two access points A2 and A3. In each of the data structures 131A to 133A, the topmost range for sample point S1 is the same which was already shown in FIG. 1B, and the ranges for the remaining sample points S2 to S9 are determined similarly. For example, the data structure 131A shows that the RF signal parameter value of access point A1, as seen from sample point S3, has a range of 1 to 5 (approximately).

Reference numerals 131B to 133B denote three value windows, one for each of the three access points. Each value window 131B to 133B is placed at the signal parameter value of the corresponding access point. As stated in connection with FIG. 1A, the target object observed signal parameter values of 2, 8 and 9 from the access points A1, A2 and A3, respectively. Accordingly, the value windows 131B to 133B are placed at positions 2, 8 and 9 in the data structures 131A to 133A. Initially in this description, we may assume the widths of the value windows to be one. The width will be further described later.

Now the idea is to use the data structures 131A to 133A and value windows 131B to 133B to determine a set of relevant sample points. The signal parameter value of access point A1 observed at the target object's location was 2 ($v_{A1}$=2). The range of possible signal parameter values for sample points S3, S6, S8 and S9 overlap the value window 131B. In other words, sample points S3, S6, S8 and S9 are candidates for relevant sample points, given the observation $v_{A1}$=2. Let us denote the set of candidate sample points, given by sample point Ai, by Ri. By repeating the same procedure for the other two access points, the positioning engine determines the following sets of relevant sample points:

R1={S3, S6, S8, S9}
R2={S2, S3, S5, S6, S8, S9}
R3={S5, S6, S7, S8, S9}

The positioning engine determines these sets of relevant sample points beforehand, for each access point and signal value, stores the sets and uses them in several future positioning cycles. The stored sets can be used until the positioning environment is recalibrated (by measurements and/or simulations).

Next, the positioning engine will determine the intersection of the above three sets R1, R2 and R3 in order to determine the set of access points that are relevant given each of the three observations $\{v_{A1}=2, v_{A2}=8, v_{A3}=9\}$. The resulting set is denoted by R:

$$R = R1 \cap R2 \cap R3$$
$$= \{S3, S6, S8, S9\} \cap \{S2, S3, S5, S6, S8, S9\} \cap \{S5, S6, S7, S8, S9\}$$
$$= \{S6, S8, S9\}.$$

Thus in this example, the set of relevant sample points was reduced from nine to three. In a real-life situation, with a larger number of sample points, the reduction ratio will be considerably higher than three. The number of target objects that can be positioned by a single positioning engine will increase approximately by the same factor.

In the above description, the width of the value windows 131B to 133B was assumed to be fixed. However, it is preferable to begin with a relatively small width, and if the resulting set of relevant sample points is empty or too small to give reliable results, another set is determined with relaxed criteria, such as wider value windows. It is self-evident that the physical value windows have been drawn for illustrative purposes only, data processors can check the numerical values without visualization.

In this example, a mathematically simple intersection of the three sets R1, R2 and R3 was used to determine a single set of access points relevant to all three observations. This means that a sample point must be relevant to each observation in order to be relevant to the combination of observations. But real-life measurements are seldom as simple as this, and later, in connection with FIG. 4, an algorithm will be described that considers a sample point relevant even if it does not appear to be relevant for one or more observations.

In some embodiments of the invention, an alarm is triggered if a value window empirically known to be appropriate produces an empty set of relevant sample points. Such a situation can be symptomatic of a device fault in the target object itself or in one of the access points (base station transmitters). Or, the propagation characteristics of the positioning environment may have been altered by temporary blockages or by permanent changes in wall structure. Whatever the cause for the empty set of relevant sample points, the cause should be investigated.

FIGS. 2A and 2B illustrate a case in which the signal parameter values are treated as continuous values and modelled as symmetrical single-peak probability distributions. A generalization to multiple-peak and non-symmetrical probability distributions will be described in connection with FIG. 5. The following notations will be used:

$A=\{a_1, a_2, \ldots, a_n\}$=a set of access points
$S=\{s_1, s_2, \ldots, s_m\}$=a set of sample points
$\overline{v}=\{v_1, v_2, \ldots, v_n\}$=a set (vector) of observed signal parameter values
$v_i$=signal value for $a_i$
NA=value not available (out of coverage, scanning failed, ... )
$P(V|s_i, a_j)$=probability distribution of signal parameter of $a_j$ at $s_i$
$\epsilon$ (epsilon)=parameter specifying risk that lookup ignores a relevant sample point; eg $\epsilon \in [0, 1]$ In FIG. 2A, reference numeral 202 denotes an x-axis which represents signal parameter values observed from an access point. The y-axis 204 represents the probability distribution $P(V|s_i, a_j)$ of signal parameter of access point $a_j$ at sample point $s_i$. The probability distribution is denoted by reference numeral 206. This technique aims at determining one or more signal value regions such that the probability for observing a value outside the regions does not exceed a predetermined probability threshold $\epsilon$. Because the probability distribution in FIG. 2A is symmetrical and single-peaked, it is possible to determine a signal value region bound by signal parameter values $v_{min}$ and $v_{max}$ which satisfies the requirement. Reference numerals 210 and 212 represent the signal parameter values $v_{min}$ and $v_{max}$, respectively, such that the probability for an observed signal parameter value to be outside the range between $v_{min}$ and $v_{max}$ is $\epsilon$, and the following equations apply:

$$P(V<v_{min}|s_i, a_j)=\epsilon/2$$

$$P(V>v_{max}|s_i, a_j)=\epsilon/2$$

In other words, the minimum and maximum signal parameter values $v_{min}$ and $v_{max}$, are not absolute minimum and maximum values but values which bound the lower and higher ends of a region which contains the bulk of the probability $P(V|s_i, a_j)$. This region is indicated by hatching.

FIG. 2B shows a cumulative probability distribution 226 which is derived from the probability distribution 206 of FIG. 2A. In FIG. 2A, the minimum and maximum signal parameter values $v_{min}$ and $v_{max}$, denoted by reference numerals 210 and 212 respectively, bound a hatched region 228 such that the cumulative probability for the signal value to be between $v_{min}$ and $v_{max}$ is 1−ϵ.

From the above-described probability considerations we can derive a relevance criterion for determining if a certain sample point is relevant in locating a target object which made an observation vector $\bar{v}$.

As stated above, $v_i$=signal value for access point $a_i \in A$. Sample point $s_j$ is considered relevant if $v_i$ is inside one of the signal value regions determined for access points $a_i$ in sample point $s_j$. In case the signal value distribution associated with sample point $s_j$ is symmetrical and single-peaked, and $v_{min}$ and $v_{max}$ are the lower and upper bound, respectively, of a signal value region determined as described above, the relevance criterion can be written as:

$$v_{min} \leq v_i \leq v_{max}$$

$R_i[v]$ denotes the resultant set of relevant sample points assuming that the observed signal parameter value of access point $a_i$ is v.

FIG. 3 shows an initialization algorithm 300 for initializing sets of relevant sample points. Line 302 defines a Begin . . . End loop which is executed for each access point $a_j$ in the set A of sample points. Line 304 empties the set $R_j[v]$ of relevant sample points for each possible value of the signal parameter value v. Line 306 defines Begin . . . End loop which is executed for each sample point $s_i$ in the set S of sample points. Lines 308 and 310 calculate the minimum and maximum signal parameter value, $v_{min}$ and $v_{max}$, respectively such that the probability for an observation to be lower than $v_{min}$ or higher than $v_{max}$ is ϵ. Line 314 adds the current sample point $s_i$ to the set of $R_j[v]$ of relevant sample points for the signal parameter value v.

FIG. 4 shows an algorithm 400 for finding a set $R \subset S$ of relevant sample points, ie, sample points which are relevant for determining the location corresponding to observation $\bar{v}$. Line 402 creates an empty set C which will contain a set of candidate sample points. Line 404 initializes a variable $F_{max}$ for the number of audible (detectable) access points. Line 406 begins a For loop which is executed for each signal parameter value $v_i$ in the observation vector $\bar{v}$, provided that the signal parameter value $v_i$ is not "NA" (not available). On line 408 the variable $F_{max}$ for the number of audible access points is increased by one. Line 410 begins a For loop which is executed for each sample point $s_j$ which, based on the range considerations described in connection with FIGS. 1A to 1C, is a possible sample point given the observation $R_i[v_i]$.

Line 412 begins an If . . . Then construct whose Then part is executed if sample point $s_j$ is not a member of the set C of candidate sample points. On line 414 the sample point $s_j$ is added to the set C of candidate sample points. On line 416 a hit counter F[j] is initialized to one. The Else part of the If . . . Then construct contains line 418 on which the hit counter F[j] is increased by one. In some implementations, the value added to the hit counter F[j] is not fixed at one but depends on the likelihood of the observed value.

Line 420 begins a second part of the algorithm 400. On line 420 the set of relevant sample points is initialized to an empty set. Line 422 begins a For loop which is executed for each sample point $s_j$ in the set C of candidate sample points. Line 424 is an If . . . Then construct which is executed if the number $F_{max}$ of audible access points minus the hit counter F[j] is smaller than or equal to a certain tolerance margin K. On line 426 sample point $s_j$ is added to the set R. Finally, on line 428 the resultant set R of relevant sample points is returned to the calling application.

The significance of the tolerance margin K is as follows. If K=0, the algorithm 400 operates like the procedure shown in FIGS. 1A-1C, particularly in FIG. 1C, in the sense that a sample point is considered relevant only if it is a possible sample point for every signal parameter value in the observation vector $\bar{v}$. It may happen, however, that the value of K=0 imposes too strict a criterion and produces an empty or a very small set of relevant access points. A value of K=n; n=1, 2, . . . , means that the sample point is considered relevant even if it is not present in n of the sets R1 . . . R3 shown in FIG. 1C.

FIG. 5 illustrates expansion of the single-peak examples shown in FIGS. 2A-4 to multiple peaks. Reference numeral 502 denotes an X-Y coordinate system in which a threshold level 504 intersects a curve 506. FIG. 5 shows two regions in which the curve 506 lies higher than the threshold level 504. Region $A_1$ extends from $x_1$ to $x_2$, while region $A_2$ extends from $x_3$ to $x_4$. The idea is to set the threshold level 504 such that a condition denoted by reference numeral 508 is satisfied. In plain text, the condition 508 states that the integral of the probability P(V=x), calculated over the peak regions $A_1$, $A_2$, . . . , equals 1−ϵ.

In some embodiments of the invention, the data model is not a probabilistic model. For example, the sample points may contain only some statistical summary of the measurable physical quantities such as an average, a median, a minimum, or a maximum. Also, the sample points may contain one or more of the observations as originally measured or some values derived from the observations. Yet another possibility is that sample points contain values obtained from computer simulations such as ray-tracing techniques.

In some embodiments of the invention, the relevance criteria may be based on distances to values associated with the sample points. For example, if $x_i$ is a signal value for access point $a_i$ associated with a sample point $s_j$, the lower and upper bounds for a signal value region may be defined using a predetermined margin z as:

$$v_{min} = x_i - z;$$

$$v_{max} = x_i + z.$$

Graph- and History-based Positioning

Positioning uncertainty can be further reduced by using the relevance indicators of the present invention with a graph-based positioning technique which is disclosed in applicant's PCT publication WO2004/008795, the teaching of which is incorporated herein by reference. Said PCT publication discloses the graph-based positioning technique in connection with Hidden Markov Models, but the present invention is not restricted to Hidden Markov Models. The graph-based positioning can be summarized as follows. A topology graph models the topology of the wireless communication environment. The topology graph indicates a set of nodes, wherein each node indicates a permissible location in the positioning environment. The topology graph also indicates a set of arcs, wherein each arc indicates a permissible target object transition between two nodes. The topology graph is used to estimate the target object's location based on the data model and the sequence of observations. For example, the topology graph, which models the topology of the positioning environment, can be used to exclude impossible locations and/or impossible transitions between locations.

Figure 6:
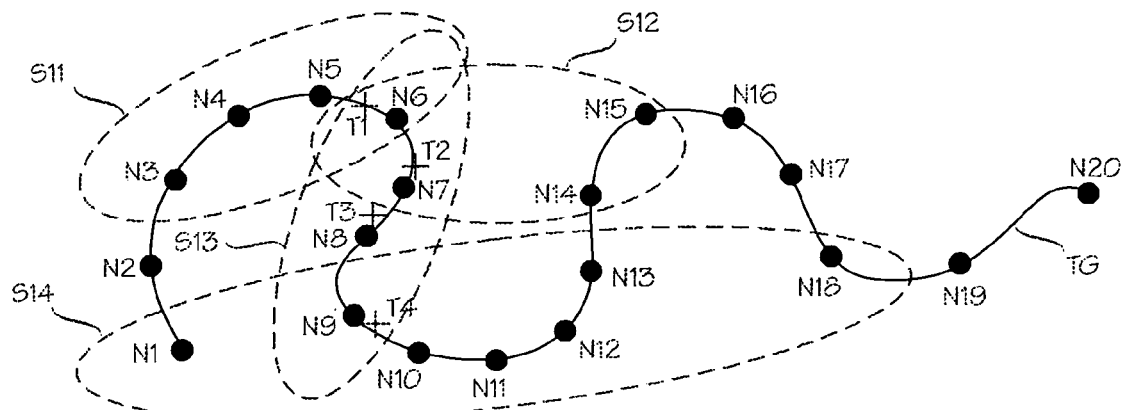
FIG. 6 illustrates the use of a graph-based positioning technique in connection with the relevance indicators of the present invention.

FIG. 6 illustrates the use of a graph-based positioning technique in connection with the relevance indicators of the present invention. In the example shown in FIG. 6, a topology graph TG models permissible locations and transitions in a positioning environment. The topology graph TG shown in this simple example comprises 20 nodes which are denoted by reference signs N1-N20. In this example, the nodes N1-N20 are also sample points of the data model. Reference signs T1-T4 denote target object locations at four different instances of time. Reference signs S11-S14 denote four different sets of relevant sample points, each set corresponding to a different instance of time T1-T4. The sets of relevant sample points can be determined by means of the relevance indicators described earlier in this specification.

A diagram 610 illustrates determination of possible target object locations at times T1-T4. At time T1, the set S11 of relevant points comprises sample points (nodes) N3-N6, as indicated by the four X signs. At time T2, the set S12 of relevant sample points comprises nodes N6, N7, N14 and N15. At time T3, the set S13 of relevant sample points comprises nodes N6-N9. Finally, at time T4, the set S14 of relevant sample points comprises nodes N1, N9-N13 and N18.

In this example, we assume that the target object can stand still or move from one node to its immediate neighbour in one unit of time, but it cannot move fast enough to jump two or more inter-node arcs in one unit of time. Based on the information available at time T1, each of the nodes N3-N6 is a possible target object location, even if all locations are not equally probable. But at time T2, the rule of at most one inter-node jump per unit of time excludes nodes N3 and N4 at time T1, because the target object could not have moved from either of these nodes to a possible node at T2. The same rule also excludes nodes N14 and N15 at time T2, because these nodes are not reachable from the set of possible nodes at T1.

At time T3, the set S13 of relevant sample points comprises nodes N6-N9. But the rule of at most one inter-node jump per unit of time excludes node N9 because N9 is two inter-node jumps away from any possible node at time T2. Finally, at time T4, the target object's location can be fixed at node N9, although the set S14 of relevant sample points also comprises nodes N1, N10-N13 and N18. But N9 is the only node that can be reached by one inter-node jump from any of the possible nodes at T3.

It can be seen that the target object's transition history at times T1 through T4 can be used to reduce (or eliminate) uncertainty concerning the target object's prior locations, in addition to reducing positioning uncertainty concerning the target object's current location. As stated earlier, based on the information available at time T1, the target object could have been at any of nodes N3-N6. But when the positioning engine has the entire transition history (four steps in this example) at its disposal, the positioning engine can establish the target object's path as N6-N7-N8-N9, as shown by the four circles in the diagram 610.

The graph-based positioning described here, in connection with FIG. 6, and in more detail in the aforementioned PCT application, can be used to further reduce positioning uncertainty, because some nodes requiring impossible transitions can be excluded. The graph-based positioning can also be used to reduce computational load, which is the principal aim of this invention, because sample points (nodes) requiring impossible transitions can be omitted from calculations. In this example, the set S14 of relevant sample points at time T4 comprises seven nodes (N1, N9-N13 and N18), but only one node, namely N9, is a possible node when the target object's entire transition history is considered.

The above example can be described formally, by using Hidden Markov Model-based techniques. Let $L(s_i)$ denote the set of neighbours of the sample points in set $s_i$, ie, sample points reachable from the sample points in set $s_i$ by one step. $L(R)$ denotes the set of neighbours of the relevant sample points:

$$L(R) = \bigcup_{i=1}^{K} L(s_i), s_i \in R$$

In the following, $HMM_1$, $HMM_2$, ... $HMM_i$, denote consecutive observation cycles in the Hidden Markov Model. The sets of relevant sample points (R) are as follows:
$HMM_1$: $R_{HMM/1} = R_1 \subset S$
$HMM_2$: $R_{HMM/2} = R_2 \cap L(R_{HMM/1})$
$HMM_i$: $R_{HMM/i} = R_i \cap L(R_{HMM/i-1})$ This feature is illustrated in the diagram 610 by the horizontal bars. The dashed horizontal bars indicate neighbours of relevant sample points, while the solid horizontal bars indicate neighbours of relevant sample points after excluding impossible transitions. It can be seen that the inventive technique reduces the computational burden because the observation probabilities need to be calculated only in respect of the sample points which belong in the sets $R_{HMM/1 \ldots i}$ of sample points deemed relevant by the HMM considerations.

If the set of relevant sample points $R_{HMM/k}$ is empty or very close to empty, this means that something unexpected has happened and some measures should be taken before positioning is resumed. For example, the observed signals may be temporarily blocked, the data model may be out of date, the sensing device attached to the target object may be malfunctioning, or the like. If the problem persists, an alert should be triggered.

In the example described in connection with FIG. 6, the topology graph TG was used such that the location of the target object TO was deemed to be one of the nodes along the topology graph TG. In an alternative implementation, the target object's location is interpreted as any point along the topology graph TG, ie, not necessarily one of the predetermined nodes N1-N20. In yet another implementation, the target object's location is interpreted as any point whose distance differs from the topology graph TG by no more than a predetermined margin, such as half a corridor width. Yet further, the topology graph TG may comprise a combination of arcs, which are suitable for modelling elongated paths, and regions, which are suitable for modelling open spaces, such as large rooms.

Device Models

Some embodiments of the invention make use of device models to correct the observations of the sensing devices. This feature is particularly useful in applications wherein the sensing devices are not specifically designed for accurate measurements. For example, wireless communication terminals may comprise a received signal-strength indicator (RSSI), but the measured signal-strengths may be grossly inaccurate. Accordingly, each device model comprises appropriate correction parameters for correcting the observations of a particular sensing device. For example, the correction parameters may comprise constant scaling parameters and/or linearization parameters. If a particular target object is provided or associated with several sensing devices, it is useful to apply a separate device model to the observations of each sensing device.

In some situations, a priori information on an optimal device model is available. For example, the sensing devices may be calibrated and a device model may be generated, or one of pre-existing device models may be selected and associated with the sensing device for future reference.

The sensing devices, in turn, may be associated with a plurality of device models such that each different device model comprises different correction parameters for correcting the sensing devices' observations. In one implementation, each different device model may be a different calibration curve.

Even if the target object (or sensing device attached to it) is capable of making near-perfect measurements in laboratory conditions, its apparent measurement capabilities may be affected by placement and/or orientation in relation to nearby objects, or height. For example, the target object of interest may be a hospital patient wearing an identification tag, which constitutes the sensing device. If the patient happens to fall down on the floor, the sensing device's orientation and height will change. Alternatively, a fracture in the sensing device's antenna may affect its sensitivity. Such situations can be detected by noting that the sensing device's observations are best explained by using a device model that applies an appropriate, experimentally-derived correction.

In some embodiments of the invention, a priori information on an optimal device model for a sensing device is not available, and the relevant sample point technique is used to select the best device model. This method is based on a discovery that when the signal values are highly corrupted or biased, the number of relevant sample points tend to be very small or even zero. On the other hand, if the observed signals correspond well to the data associated with the sample points, the number of relevant sample points is high.

Thus, if the act of applying a device model increases the number of relevant sample points, we can conclude that the device model is able to eliminate some of the device-specific bias. An optimally selected device model is one which maximises the number of relevant sample points. Accuracy of the device model selection can be further improved by analyzing a series of observations. For example, one could select the device model for which the average number of relevant sample points over the series of observations is the highest.

Further techniques for creating and using device models is disclosed in commonly-owned patent application WO2004/008796, which discloses a location-determination technique. The technique comprises determining a plurality of device models that compensate for the differences between different target objects' observations of signal quality parameters and selecting, among the multiple device models, a specific device model for a specific target object.

Although the prior art documents identified in the opening paragraph and some of the disclosed embodiments of the present invention relate to probabilistic techniques, the invention is equally applicable to non-probabilistic techniques, such as nearest-neighbour-type positioning algorithms. It is readily apparent to a person skilled in the art that, as the technology advances, the inventive concept can be implemented in various ways. The invention and its embodiments are not limited to the examples described above but may vary within the scope of the claims.

I claim:

1. A method comprising:
    positioning a target object in a wireless communication environment, said positioning comprising performing the following acts on a set of at least one positioning server:
        maintaining a data model for a plurality of sample points, each sample point comprising a sample location and a set of expected values for one or more physical quantities at that sample point;
        maintaining a set of relevance indicators and using the set of relevance indicators for determining two or more predetermined sets of relevant sample points for each value within the set of expected values of at least one of the physical quantities, wherein the two or more sets of relevant sample points are subsets of the sample points in the data model;
    storing the predetermined sets of relevant sample points and using them in several positioning cycles, wherein each positioning cycle comprises:
        receiving observations of at least one of the physical quantities at the target object's location;
        based on the observations at the target object's location and the set of relevance indicators, determining a current set of relevant sample points which comprises sample points concurrently relevant to all the observations made at the target object's location within the current positioning cycle at the target object's location; and
        estimating the target object's location based on the observations at the target object's location and on the current set of relevant sample points;
    whereby sample points not included in the current set of relevant sample points can be omitted from said estimating step.

2. A method according to claim 1, wherein the step of determining the current set of relevant sample points comprises selecting sample points whose set of expected values for the physical quantities span the observations at the target object's location with a predetermined relevance criterion.

3. A method according to claim 2, further comprising relaxing the predetermined relevance criterion if the resulting set of relevant sample points is smaller than a predetermined minimum size.

4. A method according to claim 1, further comprising triggering an alarm if the resulting set of relevant sample points is smaller than a predetermined minimum size.

5. A method according to claim 2, further comprising: forming a topology graph that models the topology of the wireless communication environment, wherein the topology graph indicates a set of nodes, each node indicating a permissible location in the wireless communication environment, and a set of arcs, each arc indicating a permissible target object transition between two nodes; and using the topology graph to estimate the target object's location.

6. A method according to claim 5, further comprising using the topology graph to record the target object's motion history and for excluding some of the selected sample points based on the target object's motion history.

7. A method according to claim 1, wherein the method further comprises the following steps for each of several device models, wherein each device model is capable of correcting observations of one or more sensing devices; using the device model to correct the observations of the at least one of the one or more sensing devices; determining the current set of relevant sample points by using the corrected observations; and wherein the method further comprises selecting the device model which maximizes the number of relevant sample points.

8. A method according to claim 1, wherein the one or more physical quantities comprise at least one signal value.

9. An apparatus comprising:
    a set of at least one positioning server;

a data model for a plurality of sample points, each sample point comprising a sample location and a set of expected values for one or more physical quantities at that sample point;

a set of relevance indicators for determining two or more predetermined sets of relevant sample points for each value within the set of expected values of at least one of the physical quantities, wherein the two or more sets of relevant sample points are subsets of the sample points in the data model;

means for storing the predetermined sets of relevant sample points and for using them in several positioning cycles, wherein each positioning cycle comprises:

receiving observations of at least one of the physical quantities made at the target object's location;

determining a current set of relevant sample points based on the observations and the set of relevance indicators, wherein the current set of relevant sample points comprises sample points concurrently relevant to all the observations made at the target object's location within the current positioning cycle at the target object's location; and estimating the target object's location based on the observations and on the current set of relevant sample points.

\* \* \* \* \*